United States Patent [19]

Shiotani

[11] Patent Number: 4,842,476
[45] Date of Patent: Jun. 27, 1989

[54] MANIPULATOR

[75] Inventor: Yosuke Shiotani, Nagoya, Japan

[73] Assignee: Star Seiki Co., Ltd., Aichi, Japan

[21] Appl. No.: 190,477

[22] Filed: May 2, 1988

[30] Foreign Application Priority Data

Mar. 24, 1988 [JP] Japan .................................. 63-70986

[51] Int. Cl.⁴ ............................................. B65G 65/00
[52] U.S. Cl. ..................................... 414/751; 74/110; 901/21
[58] Field of Search ............................... 414/749–753; 901/21; 74/99 R, 110, 109

[56] References Cited

U.S. PATENT DOCUMENTS 3,820,667 6/1974 Critchlow et al. .............. 414/752 X
4,556,141 12/1985 Faitel .................... 74/110 X
4,770,598 9/1988 Katani .................... 414/752

FOREIGN PATENT DOCUMENTS 63-122506 5/1988 Japan .

Primary Examiner—Frank E. Werner
Assistant Examiner—Donald W. Underwood
Attorney, Agent, or Firm—Frishauf, Holtz, Goodman & Woodward

[57] ABSTRACT

A manipulator for moving a workpiece to a given position includes a supporting member, a driving member, a rotary member, a moving member, a speed change mechanism and a chuck member. The supporting member is so supported on a frame as to be movable in the moving direction of the workpiece. The driving member causes the supporting member to reciprocate. The rotary member makes a pair of first pulleys rotate with movement of the supporting member, the first pulleys being rotatably supported with a predetermined spacing on said supporting member. The moving member is connected to a pair of second pulleys rotatably supported with a predetermined spacing on the supporting member. The speed change mechanism is connected at least between one of the first pulleys and one of the second pulleys and moves the moving member by rotating the second pulleys at a given rotational frequency with respect to the first pulleys which rotate with movement of the rotary member. The chuck member mounted on the moving member serves to chuck the workpiece.

2 Claims, 4 Drawing Sheets

MANIPULATOR

BACKGROUND OF THE INVENTION

1. Field of the Invention

The present invention relates to a manipulator for moving a workpiece from a given position to a predetermined position in a variety of industrial robot systems such as an apparatus for feeding a workpiece and an apparatus for carrying a workpiece or an apparatus for taking out a molded product.

2. Description of the Related Art

In a conventional manipulator for feeding or carrying a workpiece to a predetermined position by reciprocating a chuck member for chucking the workpiece, the chuck member is moved by means of a feeding screw or a nut connected to a electromotive motor or a cylinder.

Where this type of prior art manipuilator is concerned, however, a moving stroke of the chuck member is confined to a cylinder stroke or a length of axial line of the feeding screw. For this reason, the cylinder having a long stroke or the feeding screw similarly having the long stroke has to be employed in order to move the chuck member with a long stroke. This results in an increase both in size and in weight of the apparatus, which further leads to a rise in cost.

SUMMARY OF THE INVENTION:

Accordingly, it is a primary object of the present invention to provide a manipulator capable of moving a chuck member with a long stroke by employing a cylinder having a relatively long stroke or a feeding screw having a relatively small length of axial line and of diminishing both a size and a weight of the apparatus, thereby reducing the costs.

To this end, according to one aspect of the invention, there is provided a manipulator capable of moving the chuck member at a velocity higher than a moving velocity of a driving member and of decreasing a moving time of a workpiece.

These and other objects, features and advantages of the invention will become more apparent on reading the following detailed description with reference to the accompanying drawings.

Figure 1:
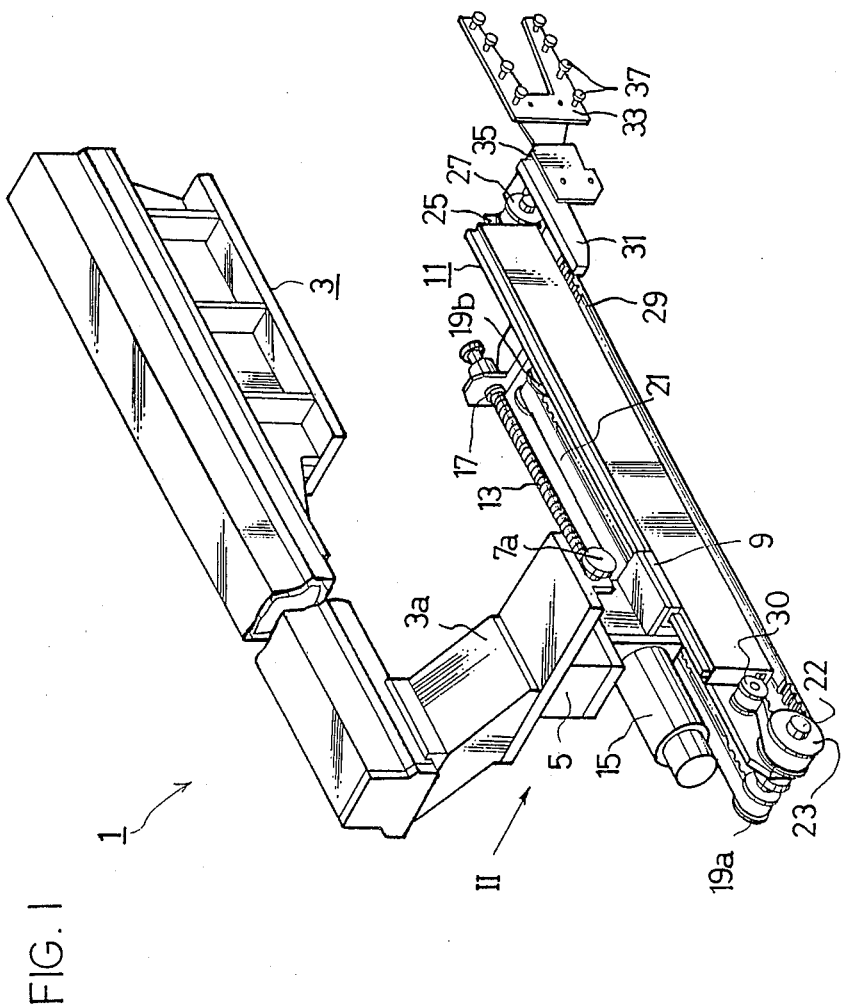
FIG. 1 is a schematic perspective view illustrating an apparatus, for taking out a molded product, to which a manipulator according to the present invention is applied.

DESCRIPTION OF THE PREFERRED EMBODIMENT:

One embodiment wherein a manipulator according to the present invention is embodied in an apparatus for automatically taking out a molded product will hereinafter be described with reference to FIGS. 1 through 3.

An apparatus 1 for automatically taking out the molded product, which constitutes the manipulator, is disposed above a molding portion of an injection molding machine (not illustrated). A body frame 3 of the molded product automatic take-out apparatus 1 is formed to have a length extending to a take-out position and a release position of a molded product defined as a workpiece in the horizontal direction. One end of the frame 3 is provided with a supporting frame 3a hanging down to incline forwards. The supporting frame 3a including its bottom surface is mounted with a pair of rails 3b extending in the direction orthogonal to the longitudinal direction of the body frame 3. A movable frame is so supported on the rails 3b as to be movable to and fro. More specifically, a feeding screw 7 including a handle 7a provided at one axial end thereof is rotatably supported on the hanging portion of the supporting frame 3a and engages with the movable frame 5. Upon rotation of the feeding screw 7, the movable frame 5 moves to and fro along the rails 3b. The movable frame 5 is provided with a rectilinear guide member 9 extending in the longitudinal direction of the body frame 3. A supporting member 11 formed of a light material such like aluminum is so supported on the rectilinear guide member 9 as to be slidable in the longitudinal direction. An electromotive motor 15 which constitutes a part of driving means is mounted on the movable frame 5 and includes its rotary shaft to which the feeding screw constituting a part of the driving means is connected. A nut member 17 provided on one side of the supporting member 11 engages with a feeding screw 13, whereby the supporting member 11 is moved in the direction of axial line as the feeding screw 13 rotates.

A pair of first pulleys 19a and 19b each having a predetermined outside diamter are rotatably supported on both ends of the supporting member 11 on one side. The first pulleys 19a and 19b are wound with a timing belt 21 of which a rotary member is composed. The timing belt 21 is partially fixed to the movable frame 5. When the supporting member 11 is set in motion along the axial line by dint of the feeding screw which goes on rotating, the first pulleys 19a and 19b are turned by the timing belt 21.

At one end of the supporting member 11 on the other side, a driving pulley 23, which constitutes one of second pulleys and has an outside diameter that is almost twice as large as that of the first pulley 19a, is fixed to a shaft 22 of the first pulley 19a. A speed change mechanism is so constructed that a ratio of outside diameter of the driving pulley 23 to that of the first pulley 19a is set to approximately 2. Fixed to the other end of the supporting member 11 on the other side is a stay 25 on which a driven pulley 27 constituting the other of the second pulleys is rotatably supported. Stretched between the driving pulley 23 and the driven pulley 27 is a timing belt 29 of which a moving member consists. Note that a tension roll 30 for tensing the timing belt 29 by its coming in press-contact with an outer peripheral surface thereof is rotatably supported on the supported member 11.

A rail portion 11a extending in the longitudinal direction is mounted on a lower end surface of the supporting member 11. Slidably placed on the rail portion 11a is a chuck mounting plate 31 which constitutes a part of a chuck member. This chuck mounting plate 31 is also fixed to the timing belt 29.

A chuck plate 33 serving as one of components of the chuck member is attached to the chuck mounting member 31 through a posture control member 35 consisting of an inversion mechanism and an oscillaltion mechanism. This chuck plate 33 is fitted with an absorption member 37 for holding a molded product in a absorption manner.

Figure 2:
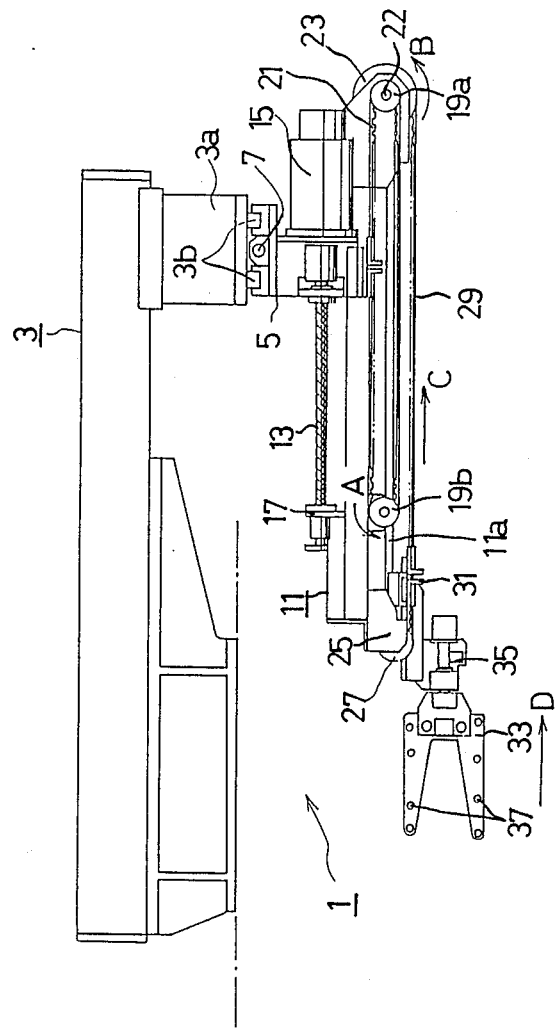
FIG. 2 is a rear elevation taken in the direction of an arrow II of FIG. 1.
Figure 3:
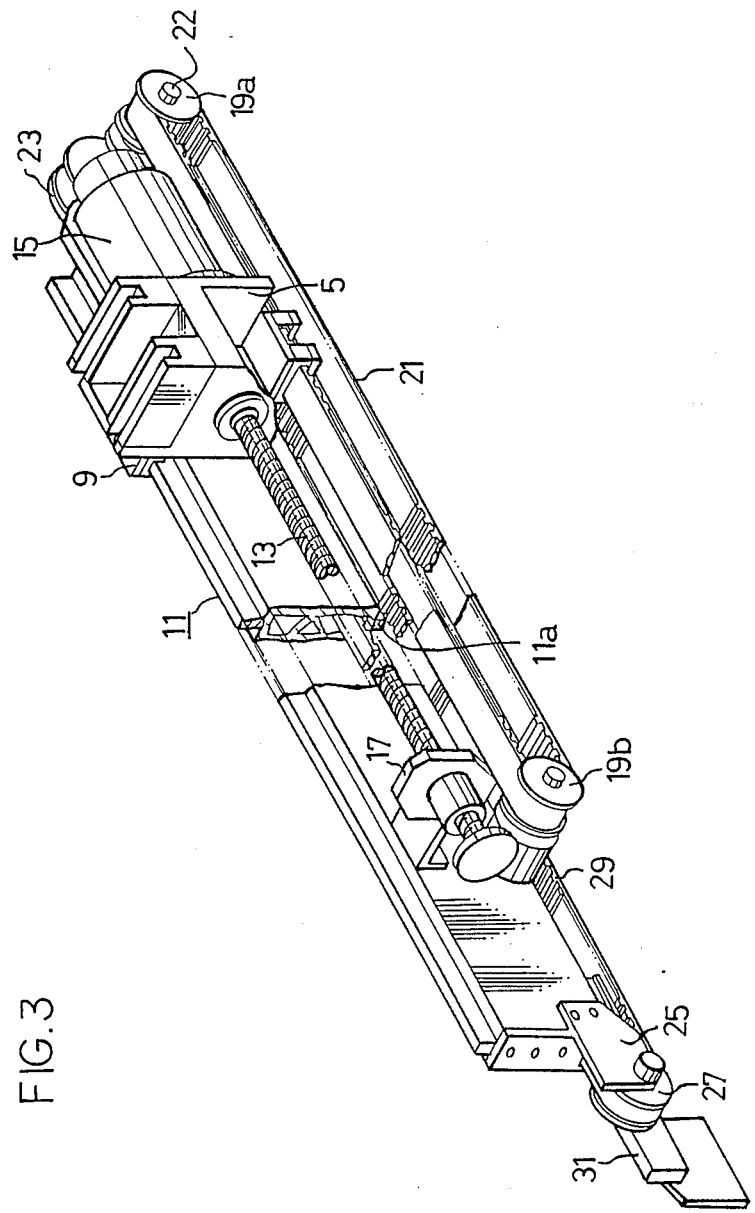
FIG. 3 is a schemtic rear perspective view illustrating a moving mechanism of the chuck member.
Figure 4:
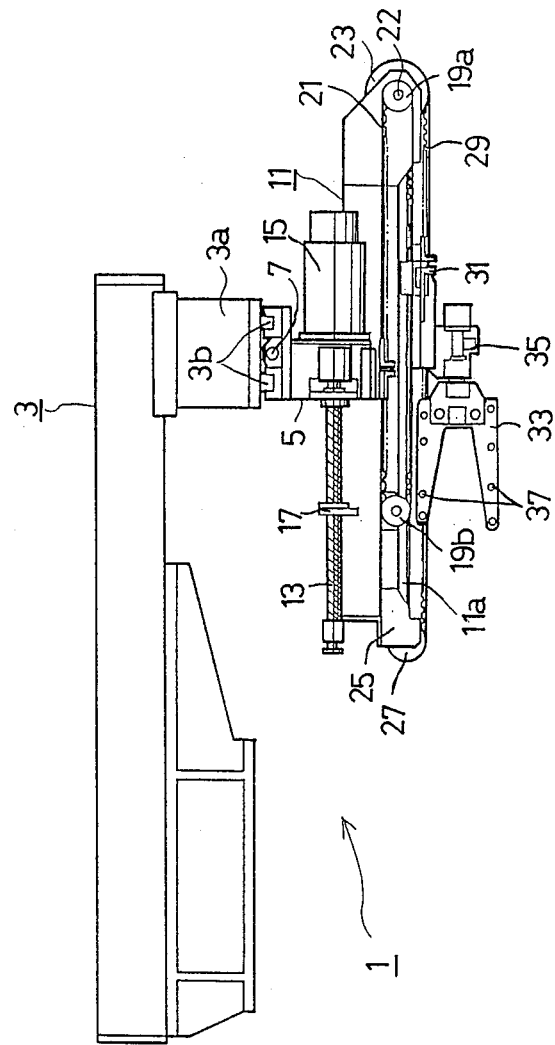
FIG. 4 is a rear elevation depicting a moving state of the chuck member.

Next, the description will be focused on the operation of the thus constructed apparatus 1 for automatically taking out the molded product, referring to FIGS. 2 and 4.

The molded product is chucked with the help of the absorption member 37 on the left side shown in FIG. 2. Subsequent to this step the feeding screw 13 is rotated in a desired direction by means of the electromotive motor 15 driven in response to a molding termination signal transmitted from an injection molding machine. The supporting member 11 is moved in the righthand direction in FIG. 2 through the nut member 17 engaging with the feeding screw 13. At this time, because the timing belt 21 is fixed to the movable frame 5, the first pulleys 19a and 19b are rotated in the direction indicated by a solid line arrow A of FIG. 2 as the supporting member 11 moves.

On the other hand, upon rotation of the first pulleys 19a and 19b which rotation is concomitant with movement of the supporting member 11, the driving pulley 23 coaxially connected to the pulley 19a is rotated in the direction of a solid line arrow B depicted in FIG. 2 at a velocity that is substantially twice that of each of the first pulleys 19a and 19b. The timing belt wound both on the driving pulley 23 and on the driven pulley 27 is set in motion in the direction of a solid line arrow C shown in FIG. 2. Subsequently, the chuck plate 33 moves in the direction of a solid line arrow C of FIG. 2 with a moving stroke of the supporting member 11 and the timing belt 29 at a velocity corresponding to a moving speed of the supporting member 11 and the timing belt 29, thereby moving the molded product held by the absorption member 37 in the right direction of FIG. 4.

A posture of the chuck plate 33 is controlled in a predetermined direction by use of the posture control member 35 actuated subsequent to the above-described operation. After this control, the molded product is taken out in a release position on releasing the absorption by the absorption member 37.

The description given above is based on the embodiment where the present invention is applied to the apparatus for automatically taking out the injection-molded product. The present invention may, however, be embodied in, e.g., an apparatus for feeding a workpiece to a processing device or an apparatus for carrying the workpiece processed by the processing device. A workpiece moving mode may include the ways in which the workpiece is moved in the horizontal direction or in the up-and-down direction, or alternatively the workpiece is moved while assuming an oblique posture.

As discussed above, the driving member is composed of the electromotive motor 15 and the feeding screw but may be comprised of an air cylinder. The rotary member and the moving member are constituted by the timing belts 21 and 29. However, any one of the members or the both of them may be composed of chains. Besides, the rotary member may consist of a rack-gear which is partially fixed to the frame and meshes with the first pulley.

As explained earlier, the outside diameter of the driving pulley 23 is nearly twice as large as that of each of the first pulleys 19a and 19b, thus constructing the speed change mechanism. The speed change mechansim may, however, be constituted by providing a plurality of gears each having its teeth whose number corresponds to a predetermined variable speed ratio between the first pulleys and the second pulleys. In this arrangement, the second pulleys are rotated at the predetermined variable speed ratio to a rational fequency of the first pulley.

Although one illustrative embodiment of the present invention has been described in detail with reference to the accompanying drawings, it is to be understood that the invention is not limited to this precise embodiment. Various changes or modifications may be effected therein by one skilled in the art without departing from the scope or spirit of the invention.

What is claimed is:

1. A manipulator for moving a workpiece to a predetermined position, comprising:

a supporting member so supported on a frame as to be movable in a moving direction of said workpiece;

a nut member fixed to said supporting member; a feeding screw engaging with said nut member;

electromotive motor means connected with said feed screw for rotating said feeding screw so as to reciprocate said supporting member;

a pair of first pulleys rotatably supported with a given spacing on one side of said supporting member;

first timing belt means for connecting said pair of first pulleys, said first timing belt means partially fixed to said frame so as to rotate said first pulleys as said supporting member moves;

a pair of second pulleys rotatably supported with a predetermined spacing on the other side of said supporting member;

second timing belt means for connecting said pair of second pulleys;

at least one of said second pulleys coaxially connected with one of said first pulleys, said one of said second pulleys having an outside diameter ratio corresponding to a predetermined variable speed ratio for rotating said one of said second pulleys at a predetermined rotational frequency with respect to said first pulley as said first timing belt means moves; and chuck means connected with said second timing belt means for chucking said workpiece.

2. A manipulator for moving a workpiece to a predetermined position, comprising:

a supporting member so supported on a frame as to be movable in a moving direction of said workpiece;

means mounted on said frame for reciprocating said supporting member;

a pair of first pulleys rotatably supported with a given spacing on one side of said supporting member;

first timing belt means for connecting said pair of first pulleys, said first timing belt means partially fixed to said frame so as to rotate said first pulleys as said supporting member moves;

a pair of second pulleys rotatably supported with a predetermined spacing on the other side of said supporting member;

second timing belt means for connecting said pair of second pulleys;

at least one of said second pulleys coaxially connected with one of said first pulleys, said one of said second pulleys having an outside diameter ratio corresponding to a predetermined variable speed ratio for rotating said one of said second pulleys at a predetermined rotational frequency with respect to said first pulley as said first timing belt means moves; and chuck means connected with said second timing belt means for chucking said workpiece.

* * * * *